J. R. HOLLEY.
PERCOLATOR.
APPLICATION FILED NOV. 24, 1908.
964,518.　　　　　　　　　　　　　　　Patented July 19, 1910.
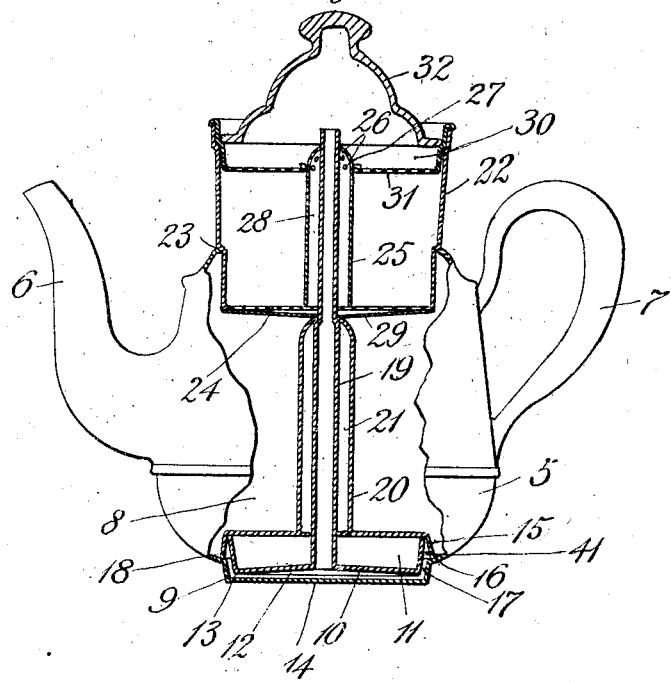
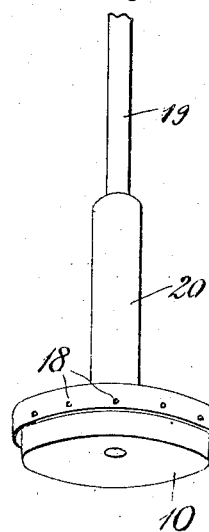
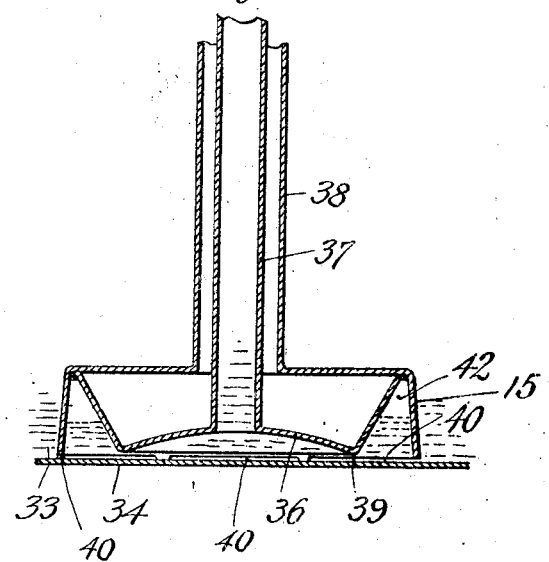
Witnesses:
Inventor:
Julian R. Holley
By his Attorney

UNITED STATES PATENT OFFICE.

JULIAN R. HOLLEY, OF BRISTOL, CONNECTICUT, ASSIGNOR TO THE BRISTOL BRASS COMPANY, OF BRISTOL, CONNECTICUT, A CORPORATION OF CONNECTICUT.

PERCOLATOR.

964,518.  Specification of Letters Patent.  Patented July 19, 1910.

Application filed November 24, 1908. Serial No. 464,244.

*To all whom it may concern:*

Be it known that I, JULIAN R. HOLLEY, a citizen of the United States, and a resident of Bristol, in the county of Hartford and State of Connecticut, have invented a new and Improved Percolator, of which the following is a specification.

This invention relates to the general class of devices for making hot beverages, such as coffee or the like, and the object of the invention is to provide a device of this class having novel features of advantage and utility.

A form of device in the use of which the objects sought may be attained is illustrated in the accompanying drawings, in which—

Figure 1 is a view partially in elevation and partially in central longitudinal section of a coffee pot or percolator embodying my invention. Fig. 2 is a perspective view of the fountain base and tube. Fig. 3 is a detail view in central lengthwise section through the bottom portion of a pot and fountain base, illustrating another embodiment of the invention.

The device embodying the invention herein shown and described has a heating or generating chamber arranged to contain the liquid in a comparatively thin mass, which is of particular advantage in that the liquid may be quickly heated to a temperature to cause flow through the fountain tube, the means for supplying the liquid to this generating chamber being such as not to reduce the temperature of the liquid therein to an extent to unduly check the flow through the fountain tube.

In the accompanying drawings the numeral 5 indicates a pot as a whole, which may be of any desired form and constructed of any suitable material, this pot having a spout 6 and a handle 7. The pot incloses and constitutes a reservoir 8 to contain the main body of the liquid contents, and the bottom of the pot has a depression 9 preferably located in the center thereof. A fountain base 10 is constructed to set in the depression 9, this base having a closed insulating chamber 11, the air in which acts as an insulator to check the transmission of heat from the heating or generating chamber to the main contents of the pot in the reservoir 8. The bottom of the fountain base is concaved as shown in Fig. 1 of the drawings to provide a recess or generating chamber 12, the edge of which is located near the bottom 14 of the depression 9. An apron 15 extends around the fountain base, projecting downward and resting upon the bottom 16 of the main body of the pot and near the edge of the depression 9, thus providing an inlet chamber 17 between the wall of the depression and the fountain base, which chamber communicates through the passage underneath the edge 13 with the generating chamber formed by the recess 12. Openings 18 are formed through the apron 15 for the supply of liquid from the reservoir 8 to the inlet chamber and thence to the heating or generating chamber 12. A fountain tube 19 secured to the fountain base 10 extends through the insulating chamber 11 and reservoir 8, the opening through this tube communicating with the generating chamber or recess 12. An insulating tube 20 extends along and surrounds the fountain tube 19, providing an insulating chamber 21 between the fountain tube and the insulating tube to prevent the cooler content of the reservoir 8 from lowering the temperature of the liquid passing through the fountain tube and thus checking the flow through such tube.

A receptacle 22 for coffee or like material is constructed to fit and rest within an opening 23 at the top of the pot, the bottom 24 of the receptacle being perforated in a manner common to devices of this class. A sleeve 25 projects upward within the receptacle from the perforated bottom, the upper end of the sleeve being provided with means for permitting overflow of liquid from the receptacle. The preferred form of overflow, as shown herein, consists of perforations 26 in the sleeve near the upper end. The perforations 26 are formed in a rounded end 27 of the sleeve which is reduced as shown and has an opening for the reception of the fountain tube 19, that passes upward beyond this lip, said tube and said sleeve 25 being of such size that a passage 28 is provided between them. A bar 29 is secured to the bottom of the receptacle 22, extending across underneath the perforated bottom thereof, and having openings to receive the fountain tube and thus aid in maintaining said tube centrally in the sleeve 25. A basin 30 rests within the otherwise open end of the receptacle 22, this basin having a perforated bottom 31 and a cover 32. The outlet end of the fountain tube 19 is located in this basin and the cover 32 is preferably composed of glass. Any suitable means for securing the receptacle 22 to the pot and the cover to the basin may be employed.

When the device is used in a pot without the depression hereinabove described, the parts are constructed and arranged as shown in Fig. 3 of the drawings in which the pot 33, the lower portion only of which is shown, has a flat bottom 34 upon which the apron 15 rests. The fountain base 36 is of similar construction to that hereinabove described, having a fountain tube 37 projecting upward therefrom and an insulating tube 38 surrounding the fountain tube. In this form of construction the apron 15 is preferably of a length to raise the edge 39 of the fountain base slightly from the bottom of the pot to allow entrance of fluid to the chamber underneath the fountain base.

Any means for permitting entry of fluid into the chamber between the apron 15 and the fountain base may be employed, such as serrations 40 or openings as described with reference to the apron 15, and, in fact, without such openings or serrations it will be found that the pressure of the main body of the liquid within the pot will cause a flow under the edges of the apron and fountain base sufficient to keep the chamber underneath said base properly supplied with fluid, and I do not therefore limit myself to a structure in which the openings or serrations are present in the apron or in which a decided space is provided between the edge of the fountain base and the bottom of the pot, as the unevenness of the contacting surfaces or the ability of the fountain base to move upward to a slight degree, either or both, will allow for entry of fluid to the chamber underneath the fountain base for the purpose described.

The construction of the apron and the action of the fluid are such that the air cannot be entirely displaced from the chamber between the apron and the fountain base, a space being thus left at the top of the chamber between such parts, this being denoted by the numeral 41 in Fig. 1 and by the numeral 42 in Fig. 3 of the drawings. This provides an insulating space or chamber to aid in preventing the raising of the temperature of the fluid and contents of the main portion of the pot under the influence of the hotter liquid in the chamber underneath the fountain tube, or the lowering of the latter under the influence of the cooler contents in the main body of the pot. The insulating chamber within the fountain base may communicate with the chamber between the fountain and insulating tubes, as shown in Fig. 3 of the drawings, or be separated therefrom as shown in Fig. 1.

It will be noted that the improved device herein illustrated and described not only provides for the immediate heating of the contents of the generating chamber, thus providing a quick and rapid flow through the fountain tube, but the construction of the basin provides means for diffusing the liquid contents over the entire surface of the coffee or other material contained in the receptacle 22, and should the flow of liquid through the fountain tube be faster than the percolation of the liquid through the contents of the receptacle, such excess flow is taken care of by the overflow through the sleeve 25.

The construction of the overflow from the receptacle 22 is not confined to a perforated sleeve as shown herein, as various means of effecting this result may be devised within the scope and intent of the invention, and while there is shown and described herein a preferred form of construction embodying the invention as a whole, such construction may be departed from to a greater or lesser extent without avoiding the invention, which is therefore not limited to the precise construction herein shown and described.

I claim—

1. A pot, a fountain base formed as an air chamber with side, bottom and top walls, a fountain tube extending from the bottom of the base through said air chamber, a receptacle arranged to receive flow from said fountain tube, and an apron extending around said base close to the side thereof and secured at one edge thereto and extending toward the bottom of the base forming a narrow space for the passage of fluid between the side wall of the base and said apron.

2. A pot, a fountain base formed as an air chamber with side, bottom and top walls, a fountain tube extending from the bottom of the base through said air chamber, a receptacle arranged to receive flow from said fountain tube, and an apron extending around said base close to the side wall thereof and secured at one edge thereto and extending toward the bottom of the base forming a narrow space for the passage of fluid between the side wall of the base and said apron, said apron being arranged to form a support for said base.

3. A pot, a fountain base formed as an air chamber with side, bottom and top walls, a fountain tube extending from the bottom of the base through said air chamber, a receptacle arranged to receive flow from said fountain tube, and an apron having perforations therethrough and extending around said base close to the side thereof and secured at one edge thereto and extending toward the bottom of the base forming a narrow space for the passage of fluid between the side of the base and said apron.

4. A pot having a depressed portion in the bottom thereof, a fountain base formed as an air chamber with top, bottom and side walls, a fountain tube extending from the bottom of the base through said air chamber, a receptacle arranged to receive flow from said tube, and an apron extending around the base close to the side thereof and secured at one edge thereto and projecting toward the bottom of the base and arranged to rest upon the bottom of the pot around said depression forming a narrow space for the passage of fluid between the base and said apron.

5. A pot having a depressed portion in the bottom thereof, a fountain base formed as an air chamber with top, bottom and side walls, a fountain tube extending from the bottom of the base through said air chamber, a receptacle arranged to receive flow from said tube, and an apron having perforations therethrough and extending around the base close to the side thereof and secured at one edge thereto and projecting toward the bottom of the base and arranged to rest upon the bottom of the pot around said depression forming a narrow space for the passage of fluid between the base and said apron.

6. A pot, a fountain base formed as an air chamber with top, bottom and side walls, a fountain tube projecting from the bottom of the base through said air chamber, a receptacle arranged to receive flow from said tube, and an apron having its upper edge secured to said base and projecting toward the bottom thereof forming a narrow space for the passage of fluid between the side of the base and said apron.

7. A pot, a fountain base formed as an air chamber with top, bottom and side walls, a fountain tube projecting from the bottom of the base through said air chamber, a receptacle arranged to receive flow from said tube, and an apron having its upper edge secured to the top of said base and projecting toward the bottom thereof forming a narrow space for the passage of fluid between the side of the base and said apron.

8. A pot, a fountain base formed as an air chamber with top and bottom walls, and with a side wall formed at an angle to the axis of the base, a fountain tube projecting from the bottom of the base through said air chamber, a receptacle to receive flow from said fountain tube, and an apron having its upper edge secured to the side of the base and projecting toward the bottom thereof forming a narrow space between the base and said apron for the passage of liquid, said apron being arranged to form a rest for said base.

JULIAN R. HOLLEY.

Witnesses:
IRA L. NEWCOMB,
CHAS. F. SCHMETZ.